United States Patent
Haran et al.

(10) Patent No.: US 6,438,176 B1
(45) Date of Patent: Aug. 20, 2002

(54) DIGITAL GAUSSIAN FREQUENCY SHIFT KEYING MODULATOR

(75) Inventors: Onn Haran, Ganey Tikva; Haviv Ilan, Rosh Haayin; Yaron Kaufmann, Tel Aviv, all of (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/542,732

(22) Filed: Apr. 4, 2000

(51) Int. Cl.$^7$ .............................................. H04L 27/12
(52) U.S. Cl. ........................ 375/303; 375/272; 332/100
(58) Field of Search ................................. 375/272, 303, 375/334; 332/100

(56) References Cited

FOREIGN PATENT DOCUMENTS

WO    WO 01/41381 A2  *  6/2001

OTHER PUBLICATIONS

"*The Communications Handbook*", Jerry D. Gibson, CRC Press, 1997, pp. 1361–1363.
"*Mobile Radio communications*", John Wiley & Sons Ltd., 1992, pp. 523–544.

* cited by examiner

*Primary Examiner*—Temesghen Ghebretinsae
(74) *Attorney, Agent, or Firm*—Ronald O. Neerings; Wade James Brady, III; Frederick J. Telecky, Jr.

(57) ABSTRACT

A GFSK modulator suitable for use in an RF communication system comprising a modular subsystem and a baseband processor subsystem which is implemented digitally. The baseband processor subsystem comprises a Gaussian filter, phase accumulator and cosine and sine look up tables. The baseband processor functions to convert an input data sequence into I and Q output signals. The I and Q signals are subsequently modulated by a quadrature modulator to yield a GFSK modulated signal which can then be amplified and placed into the channel. The response of the Gaussian filter is pre-calculated for all possible combinations of the input data and the results are quantized and stored in a look up table. The quantized phase results (either magnitude or differences), generated in response to the input data, are accumulated digitally and converted to I and Q signals. The modulator may be implemented using three look up tables: two of which are for storing cosine and sine values and the third is used to store the pre-calculated quantized phase results (either absolute magnitudes or differences). The size of the three look up tables may be reduced by taking advantage of the symmetry properties of the Gaussian filter response and the cosine and sine functions.

21 Claims, 9 Drawing Sheets

DIGITAL GAUSSIAN FREQUENCY SHIFT KEYING MODULATOR

FIELD OF THE INVENTION

The present invention relates generally to data communication systems and more particularly relates to a digital implementation of a Gaussian Frequency Shift Keying (GFSK) modulator.

BACKGROUND OF THE INVENTION

Frequency Modulation (FM) is a well-known modulation technique frequently used in communications systems to communicate an analog input signal from one point to another over a channel. For data transmission, a digital FM technique known as Frequency Shift Keying (FSK) is used whereby a carrier signal is shifted between two frequencies in accordance with the data to be transmitted. The modulation index of an FSK communication system can be configured to be either narrowband or wideband. FSK signals can be demodulated using both coherent and noncoherent detection. Minimum Shift Keying (MSK), is obtained when the frequency deviation is equal to one half the bit rate, as expressed in Equation 1 below.

$$\Delta f = \frac{1}{2T_b} \quad (1)$$

where $T_b$ equals the bit duration of the input data. The modulation index h in this case is equal to ½.

$$h = \frac{\Delta f}{T_b} = \frac{1}{2} \quad (2)$$

MSK modulation has the following properties: (1) constant envelope which is suitable for nonlinear amplification; (2) capable of coherent and noncoherent detection; and (3) the spectral width of its main lobe is 50% wider than that of a QPSK signal.

The desirable properties of MSK are retained while increasing the spectral efficiency, i.e., reducing the spectral width of the main lobe, by inserting a Gaussian low pass filter (GLPF) into the baseband processor of the MSK modulator. The combination of a GLPF with an MSK modulator is known as Gaussian MSK (GMSK). For modulations indexes h other than 0.5, the modulation technique is known generally as GFSK. GMSK modulation is of particular importance in cellular radio and cordless telephone applications.

Figure 1:
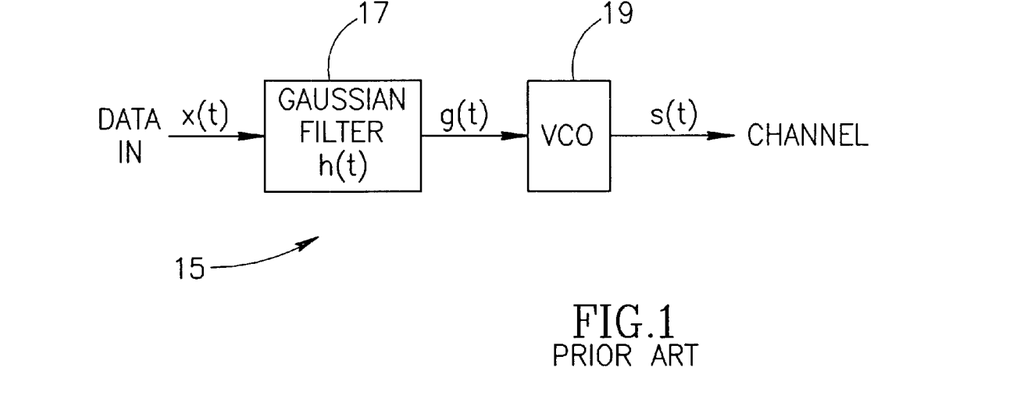
FIG. 1 is a block diagram illustrating a first prior art GFSK modulator.

A block diagram illustrating a first prior art GFSK modulator is shown in FIG. 1. The modulator, generally referenced 15, comprises a Gaussian filter 17 and a Voltage Controlled Oscillator (VCO) 19. In the typical prior art modulator, both the Gaussian low pass filter 17 and the VCO 19 are analog.

A Gaussian filter comprises a filter whose impulse response is Gaussian shaped. A Gaussian low pass filter has the following transfer function:

$$H(f) = Ae^{\left\{-\left(\frac{f}{B}\right)^2 \ln \frac{2}{2}\right\}} \quad (3)$$

where B is the 3 dB bandwidth of the filter and A is a constant. A rectangular pulse $\text{rect}(t/T) = u_T(t+T/2)$ transmitted through the filter produces the following frequency shaping pulse. It is derived from convolving the NRZ input pulse with the impulse response of the Gaussian filter:

$$h_s(t) = A \sqrt{\frac{2\pi}{\ln 2}} (BT) \int_{t/T-1/2}^{t/T+1/2} e^{\left\{-\frac{2\pi^2 (BT)^2 x^2}{\ln 2}\right\}} dx \quad (4)$$

where h(t) is the filter response and T is the bit period. The phase change over the time interval from $-T/2 \leq t \leq T/2$ is given by:

$$\theta\left(\frac{T}{2}\right) - \theta\left(\frac{-T}{2}\right) = x_0 \beta_0(T) + \sum_{-T/2-nT}^{T/2-nT} x_n \beta_n(T) \quad (5)$$

where $$\beta_n(T) = \frac{\pi h}{\int_{-\infty}^{\infty} h_s(v) dv} \int_{-T/2-nT}^{T/2-nT} h_s(v) dv \quad (6)$$

Note that the first term of Equation 5 is the contribution of the current bit while the second term is the ISI introduced by all past and future bits. A key characteristic of an ideal Gaussian filter is that it has memory properties whereby the output at any time t depends on an infinite number of signal contributions that came in the past and that will come in the future. In practice, however, a pulse truncated to an integer number of symbol intervals is used since the theoretical $h_s(t)$ is noncausal.

Figure 2:
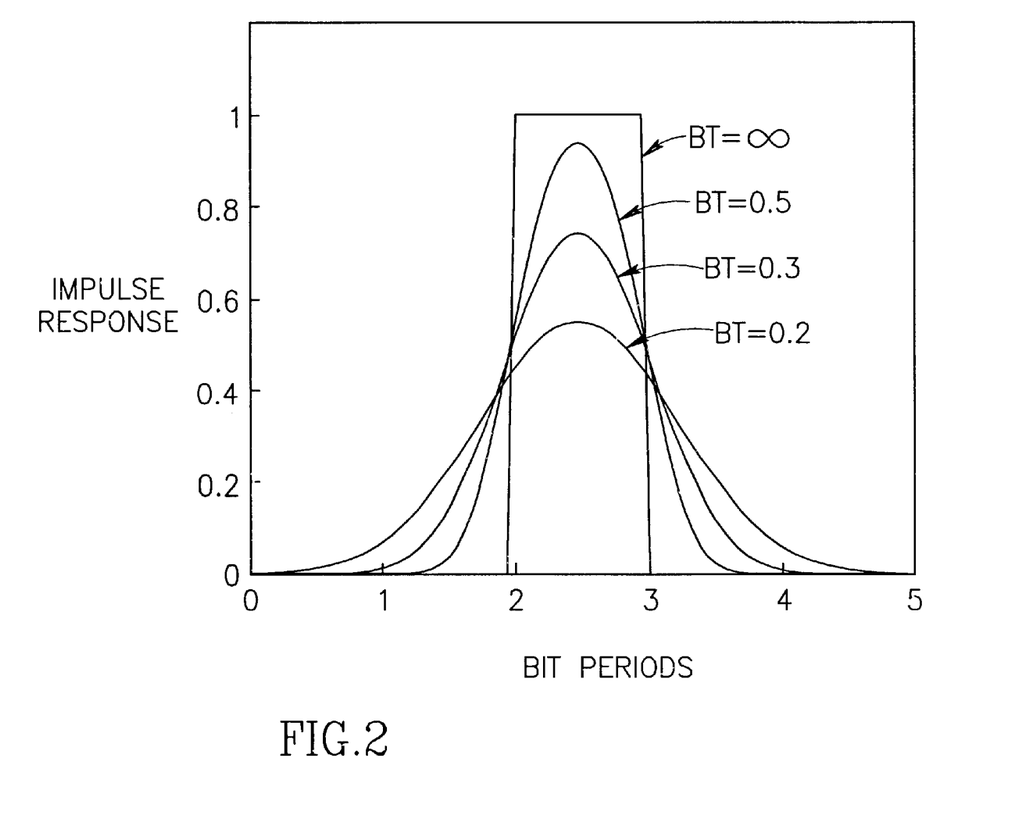
FIG. 2 is a graph illustrating the impulse response of the Gaussian filter for different values of normalized filter bandwidth BT.

A graph illustrating the impulse response $h_s(t)$ (i.e., frequency shaping pulse) of the Gaussian filter for different values of normalized filter bandwidth BT is shown in FIG. 2. A key characteristic is that as the modulator filter bandwidth decreases, the duration of its impulse response increases. Note also that the impulse response has a duration greater than a bit period T resulting in the introduction of ISI. The response is the widest for low values of BT (e.g., approximately 4 bits for BT=0.2). Lower values of BT introduce more ISI but yield narrower power density spectrums. As the number of bit periods spanned by the response increases causing larger amounts of ISI, the more difficult the realization of the receiver becomes since it must comensate for ISI of higher complexity. In addition, the BER performance degrades as the number of bit periods spanned by the impulse response increases depending on the realization of a compensating equalizer. An infinite filter bandwidth yields the narrowest impulse response having a duration of one bit.

The resultant spectrum of the modulated signal is narrower than that of an MSK signal due to the introduction of ISI into the transmitted data. The greater the bit spreading, the narrower the spectrum of the GMSK signal and the better the adjacent channel interference performance. Due to the narrower spectrum of GMSK, the channel spacings can be closer together for the same adjacent channel interference resulting in higher spectral efficiency.

Stated another way, filtering the modulating signal with the Gaussian low pass filter prior to frequency modulation functions to remove the higher frequency components in the input data thus yielding a more compact spectrum. Clock recovery and symbol detection at the receiver, however, become more complicated.

The main advantage of GMSK over MSK is that the use of the Gaussian filter prevents the instantaneous changes in frequency inherent in MSK due to the response of the Gaussian filter. This results in a power spectrum with side lobes having energy levels far lower than those of an MSK power spectrum.

Figure 3:
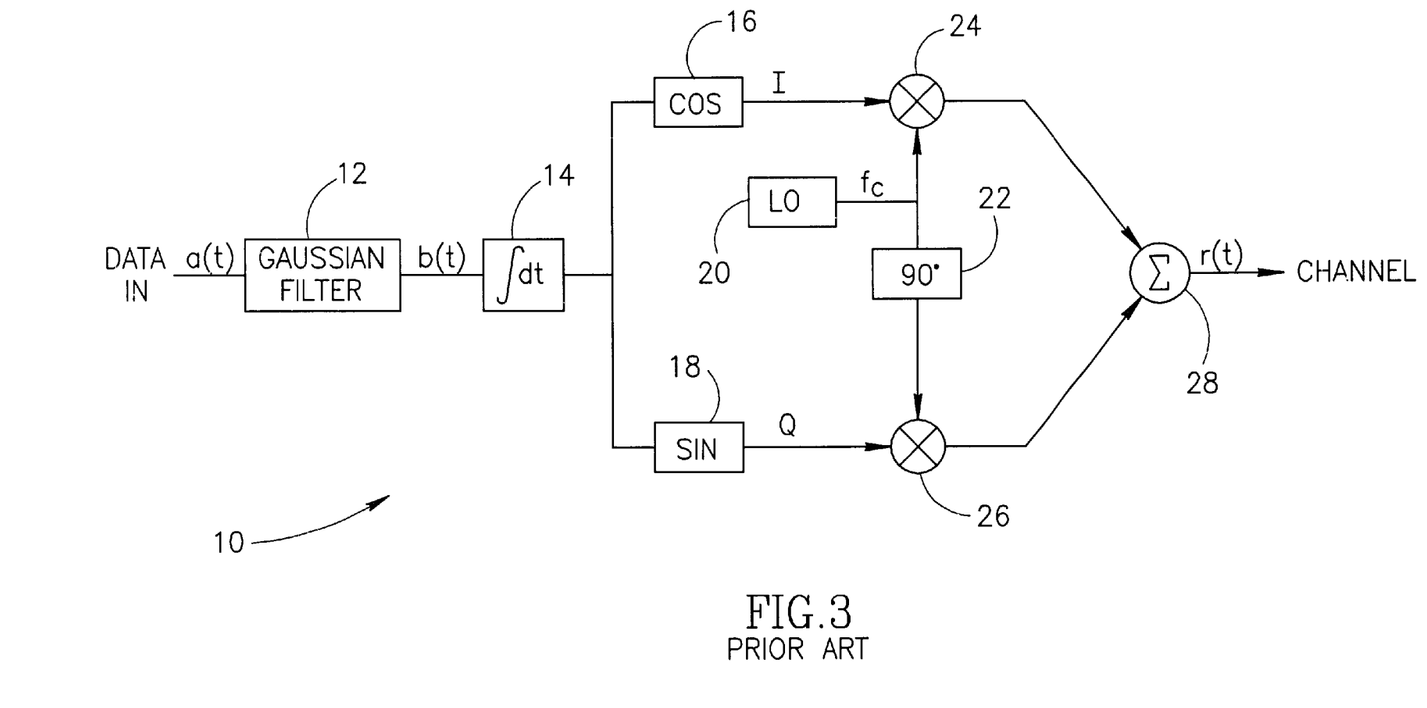
FIG. 3 is a block diagram illustrating a second prior art GFSK modulator.

A block diagram illustrating a second prior art GFSK modulator is shown in FIG. 3. The modulator, generally referenced 10, comprises a baseband GMSK processing subsystem and a quadrature modulator subsystem. The baseband GMSK processing subsystem comprises Gaussian filter 12, integrator 14 and sin and cosine generators while the quadrature modulator subsystem comprises I and Q multipliers 24, 26, respectively, local oscillator 20, 90° phase shifter 22 and summer 28.

In this prior art example, the filter and integrator in the baseband subsystem are typically analog. They may, however, be implemented digitally. Likewise, the quadrature modulation subsystem is typically implemented in analog but may be constructed digitally. The straightforward digital implementation of the filter, however, is relatively complex. The amount of memory and complexity of processing required depend on the extent of the history that needs to be considered.

As described above, the narrower the desired frequency response, the wider the impulse response of the filter and consequently the more historical bits that must be handled. For each input bit, the output of the filter comprises the combination of the filter's responses of each historical bit. This typically requires a large number of look up tables (LUTs) and associated processing and memory resources.

SUMMARY OF THE INVENTION

The present invention is a GFSK modulator suitable for use in an RF communication system. The GFSK modulator of the present invention comprises a modulator subsystem and a baseband processor subsystem that is implemented digitally. The baseband processor subsystem comprises a Gaussian filter, phase accumulator and cosine and sine look up tables. The baseband processor functions to convert an input data sequence into I and Q output signals. The I and Q signals are subsequently modulated by a quadrature modulator to yield a GFSK modulated signal which can then be amplified and placed into the channel.

A main feature of the present invention is that the Gaussian filter is implemented digitally and its phase response is precalculated and quantized. The quantized phase results are then accumulated digitally and used to generate the I and Q signals. In one embodiment, the value of the phase results themselves are used to generate the I and Q signals. In an alternative embodiment, the differences between pairs of phase results are pre-calculated, quantized and stored in a table.

The oversampling frequency (i.e., the sampling rate) is selected such that a simplified representation of the samples may be achieved. The Gaussian filter response is approximated and pre-calculated for all possible combinations of the input data. The results are stored in a look up table. In one example embodiment of the invention, the table is adapted to store three possible values for the filter response {-1, 0 or +1} which correspond to the phase contribution of one sample of the bit interval. The address to the LUT used to store the filter response is derived from N bits (the current bit and N-1 historical bits). The value of N is chosen based on the desired roll off factor for the Gaussian shaping filter.

The phase accumulator (or integrator) functions to accumulator the phase contributions of all samples in a bit interval. In one example embodiment, the accumulator is realized using an up/down/stop counter corresponding to the filter response of +1/-1/0.

The modulator may be implemented using three look up tables: two of which are for storing cosine and sine values and the third is used to store the pre-calculated quantized phase results (either absolute magnitudes or differences). The size of the three look up tables may be reduced by taking advantage of the symmetry properties of the Gaussian filter response and the cosine and sine functions.

The benefits of the GFSK modulator of the present invention include: (1) accurate modulation index; (2) accurate Gaussian shaping (3) relatively simple implementation; (4) relatively low gate count when implemented in silicon; (5) low power consumption; and (6) low cost. Approximately 600 gates are required for an implementation having the following parameters: h=0.32, BT=0.5, number of samples=8 and one history bit considered. Note that these parameters are suitable for the realization of numerous communication systems including those complying with the Bluetooth standard, for example.

There is thus provided in accordance with the present invention a digital baseband processor for generating baseband I and Q values in a Gaussian Frequency Shift Keying (GFSK) transmitter comprising a sequence look up table (LUT) adapted to generate $2^N$ sequences of differences of quantized phase results wherein N represents a current bit and N-1 history bits, the sequences of phase differences produced by calculating a response to a Gaussian filter for all possible combinations of the N bits and computing the difference between each pair of phase results in a sequence, a register adapted to store the current bit and the N-1 history bits, selection means for selecting one of the $2^N$ sequences of phase differences and for outputting the contents thereof in accordance with the contents of the register, a phase accumulator adapted to accumulate the phase differences output of the sequence LUT, a cosine LUT comprising quantized cosine values and adapted to generate an I baseband signal in accordance with the output of the phase accumulator and a sine LUT comprising quantized sine values and adapted to generate a Q baseband signal in accordance with the output of the phase accumulator.

There is also provided in accordance with the present invention a digital modulator for generating a Gaussian Frequency Shift Keying (GFSK) signal comprising a sequence look up table (LUT) for generating $2^N$ sequences of precalculated differences of quantized phase results wherein N represents a current bit and N-1 history bits, the sequences of phase differences produced by calculating a Gaussian filter response to all possible combinations of the N bits and computing the difference between each pair of phase results in a sequence, a register adapted to store the current bit and the N-1 history bits, selection means for selecting one of the $2^N$ sequences of phase differences and for outputting the contents thereof in accordance with the contents of the register, a phase accumulator adapted to accumulate the phase differences output of the sequence LUT, a cosine LUT comprising quantized cosine values and adapted to generate an I baseband signal in accordance with the output of the phase accumulator, a sine LUT comprising quantized sine values and adapted to generate a Q baseband signal in accordance with. the output of the phase accumulator and a quadrature modulator adapted to modulate the I baseband signal and the Q baseband signal with a carrier signal so as to generate the GFSK signal.

There is further provided in accordance with the present invention a method of generating baseband I and Q values in a Gaussian Frequency Shift Keying (GFSK) transmitter, the method comprising the steps of generating $2^N$ sequences of differences of quantized phase results wherein N represents a current bit and N-1 history bits, the sequences of phase differences produced by calculating a response to a Gaussian filter for all possible combinations of the N bits and computing the difference between each pair of phase results in a sequence, storing the current bit and the N−1 history bits in a memory, selecting one of the $2^N$ sequences of phase differences and outputting the contents thereof in accordance with the contents of the memory, accumulating the phase differences output of the sequence LUT, generating an I baseband signal in accordance with the output of the phase accumulator and generating a Q baseband signal in accordance with the output of the phase accumulator.

BRIEF DESCRIPTION OF THE DRAWINGS

The invention is herein described, by way of example only, with reference to the accompanying drawings, wherein.

DETALED DESCRIPTION OF THE INVENTION

Notation Used Throughout

The following notation is used throughout this document.

| Term | Definition |
|---|---|
| BPS | Bits Per Sample |
| FM | Frequency Modulation |
| FSK | Frequency Shift Keying |
| GFSK | Gaussian Frequency Shift Keying |
| GLPF | Gaussian Low Pass Filter |
| GMSK | Gaussian Minimum Shift Keying |

-continued

| Term | Definition |
|---|---|
| ISI | Intersymbol Interference |
| LPF | Low Pass Filter |
| LUT | Look Up Table |
| MSK | Minimum Shift Keying |
| NOS | Number of Samples |
| NRZ | Non Return to Zero |
| QPSK | Quadrature Phase Shift Keying |
| RF | Radio Frequency |
| VCO | Voltage Controlled Oscillator |

General Description

The present invention is a GFSK modulator suitable for use in an RF communication system. The GFSK modulator of the present invention comprises a modulator subsystem and a baseband processor subsystem that is implemented digitally. The baseband processor subsystem comprises a Gaussian filter, phase accumulator and cosine and sine look up tables. The baseband processor functions to convert an input data sequence into I and Q output signals. The I and Q signals are subsequently modulated by a quadrature modulator to yield a GFSK modulated signal which can then be amplified and transmitted through the channel.

A main feature of the present invention is that the Gaussian filter is implemented digitally and its phase response is precalculated and quantized. The quantized phase results are then accumulated digitally and used to generate the I and Q signals. In one embodiment, the value of the phase results themselves are used to generate the I and Q signals. In an alternative embodiment, the differences between pairs of phase results are pre-calculated, quantized and stored in a table.

Figure 4:
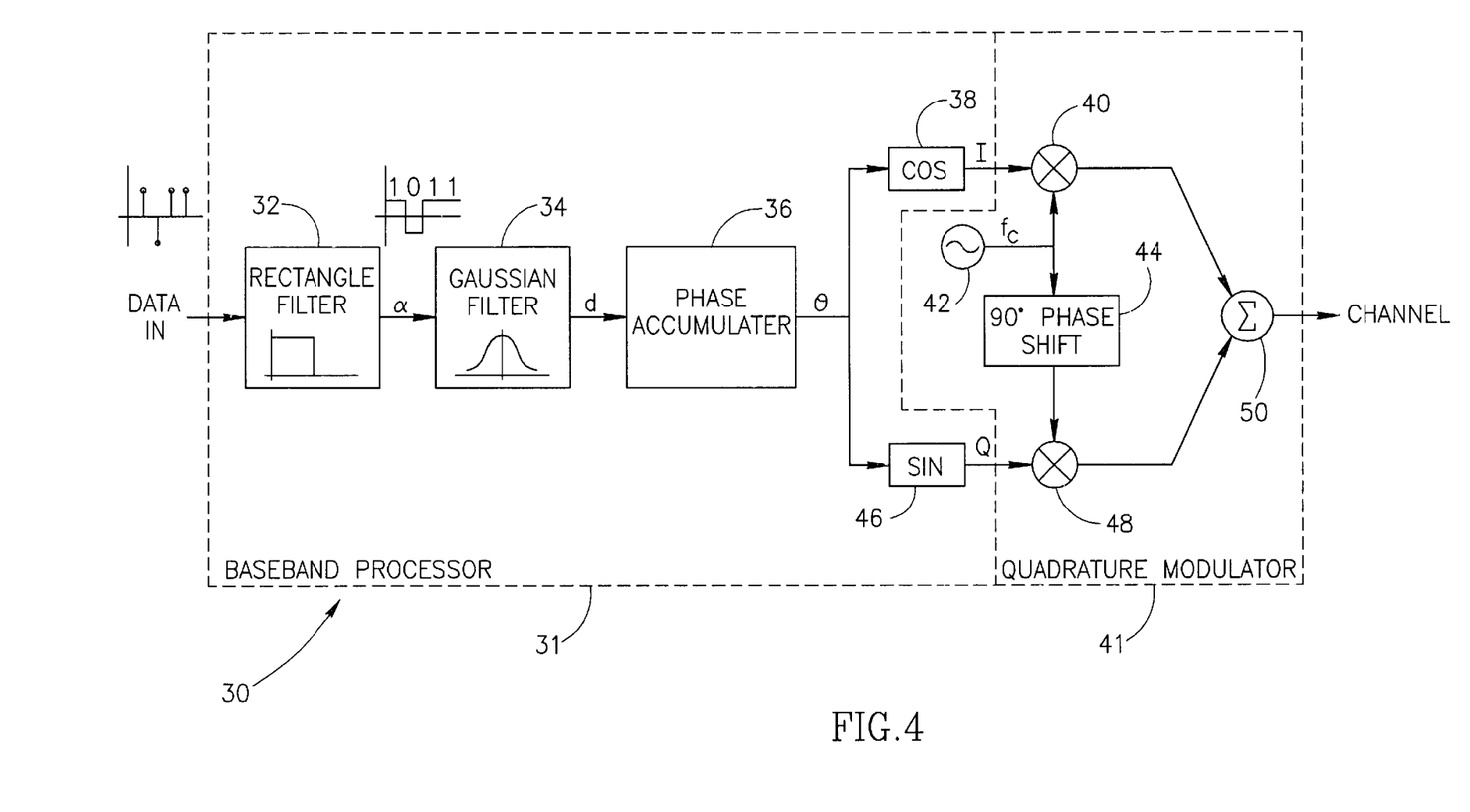
FIG. 4 is a block diagram illustrating the GFSK modulator constructed in accordance with the present invention.

A block diagram illustrating a first embodiment of the GFSK modulator constructed in accordance with the present invention is shown in FIG. 4. The modulator, generally referenced 30, comprises a baseband processing portion 31 comprising a rectangular filter 32, Gaussian filter 34, phase accumulator 36 and cosine and sine generators. The modulator 30 also comprises a quadrature modulator 41 comprising a frequency source (e.g., oscillator) 42, 90 degree phase shifter 44, mixers 40, 48 and summer 50.

A general phase/frequency modulated signal can be expressed as:

$$S_R(t,\alpha) = \sqrt{2S}\cos[w_0 t + \theta(t,\alpha)] \tag{7}$$

where S is the signal power and $w_0 = 2\pi f$ is the radian frequency of the oscillator in the transmitter. The phase function $\theta(t,\alpha)$ is defined by:

$$\theta(t, \alpha) = \frac{\pi h}{T} \int_{-\infty}^{t} d(\tau, \alpha) d\tau \tag{8}$$

where T is the bit duration and $d(t, \alpha)$ is the waveform input to the Gaussian filter. For a given data sequence which includes the current bit $$\alpha = \ldots, \alpha_{-1}, \alpha_0, \alpha_1, \ldots \text{ with } \alpha_n \epsilon\{-1,1\} \tag{9}$$

the waveform output from the Gaussian filter can be expressed as:

$$d(t, \alpha) = \sum_{-\infty}^{\infty} a_n \cdot g(t - nT) \quad (10)$$

where g(t) is the Gaussian shape function given by:

$$g(t) = \frac{BT}{T\sqrt{2\pi}} e^{-(\frac{t}{T})^2 (\frac{BT}{T})^2} \quad (11)$$

Figure 5:
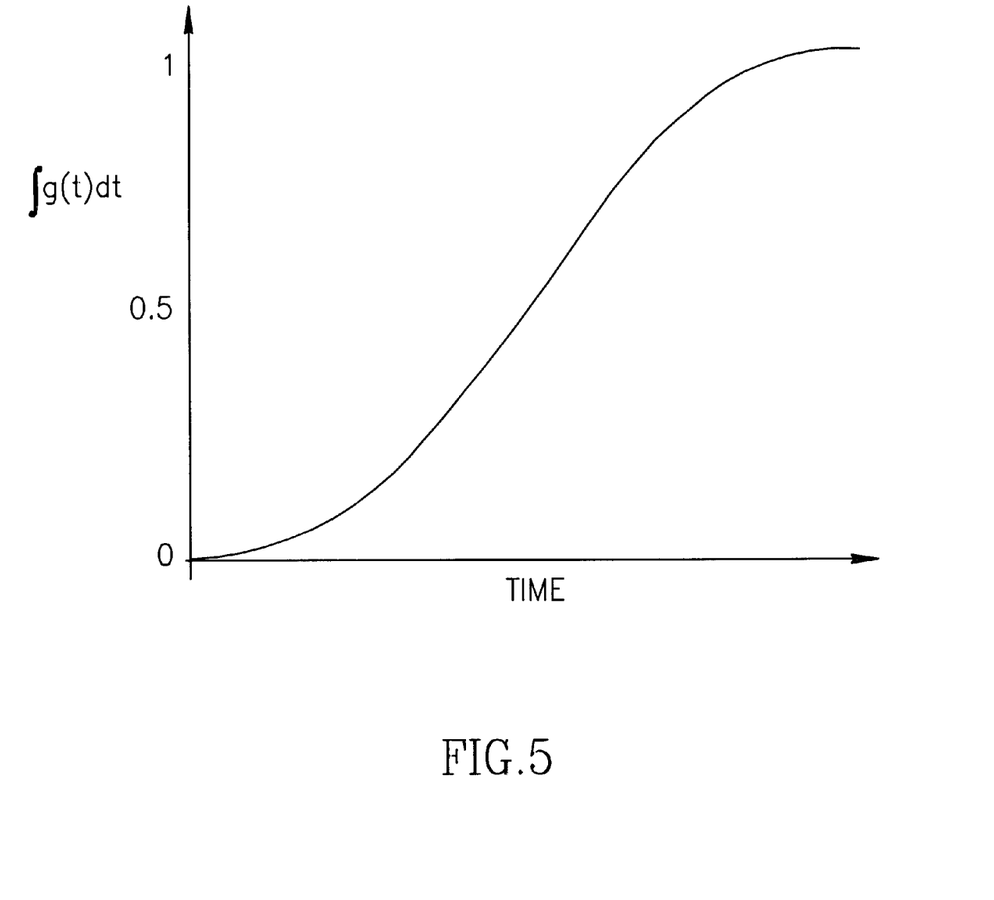
FIG. 5 is a graph illustrating the integral of the Gaussian filter response after convolution with the rectangular filter.

The term BT represents the roll-off factor. The function g(t) converges to 0 when t>>Γ which represents the cutoff for the Gaussian filter wherein values close to zero are not considered. The convergence time Γ depends on the roll off factor (i.e., Γ corresponds to the number of bits considered in the Gaussian function response). For example, Γ=2 may be used for a BT value of 0.5, while Γ=3 may be used for a BT value of 0.3. A graph illustrating the integral of the response of the Gaussian filter 34 response after convolution with the rectangular filter 32 is shown in FIG. 5.

Thus, the expression d(t, α) can be rewritten using the convergence quality Γ:

$$d(t, \alpha) = \sum_{-\Gamma}^{\Gamma} a_n \cdot g(t - nT) \quad (12)$$

This expression for d(t, α) represents the response of the Gaussian filter 34 to the input data sequence α.

In the digital implementation of a system, the time scale is not continuous but is discrete. Further, each bit is divided into a plurality of samples known as the oversample ratio and is represented by the number of samples (NOS). The phase function given in Equation 8 above can be rewritten to represent the phase in a discrete digital system:

$$\theta(n, \alpha) = \theta\left(\left\lfloor\frac{n}{NOS}\right\rfloor, \alpha\right) + \sum_{L=0}^{n-NOS\lfloor\frac{n}{NOS}\rfloor} \left\{\frac{h\pi}{T} d(L, \alpha)\right\} \quad (13)$$

Thus, at any given moment, the phase depends on all past history bits up to and including the current bit. As is shown by Equation 13, the resultant phase is an accumulation of the phase contributions of all past history bits combined with the current bit.

A key feature of the present invention is that the phase output of the Gaussian filter is quantized and can be precalculated according to the number of history bits to be considered by the Gaussian filter response. In accordance with the invention, the value of the response d(t, α) of the Gaussian filter to the input data sequence a is precalculated for all possible data sequences. The number of possible combinations of data history bits and the current bit is $2^\Gamma$. Using the symmetry property of the Gaussian filter, however, the number of combinations can be reduced.

$$d(t, \alpha) = -d(t, -\alpha) \quad (14)$$

Therefore, the number of combinations that need to be considered is reduced to $2^{\Gamma-1}$.

In order to quantize the phase, a basic phase quantization step must be selected. Preferably, the phase quantization step is selected such that:

1/(phase quantization step)=integer number  (15)

For example, consider a modulation index h=0.32 and NOS=8. The phase step can be set to 0.04/Mπ where 1/0.04=25. In another example, consider h=0.325 and NOS=13. The phase step can be set to 0.025/Mπ where 1/0.025=40. In both cases, the value M is a positive integer that functions to determine the accuracy of the phase quantization. The phase quantizations are stored in a look up table (LUT) in the baseband processor. Also stored in LUTs are the cosine and sine values used to generate the I and Q outputs of the baseband processor. Thus, the value M determines the required sizes for the phase quantization, cosine and sine LUTs. A higher accuracy (i.e., higher value of M) requires larger sizes for all three LUTs.

In accordance with the present invention, the phase increments are precalculated for all possible combinations of the history bits and the current bit by computing the response of the Gaussian filter to each bit combination using Equation 12 above. The result is rounded to the nearest phase quantization level.

$$D(t, \alpha) = \left\lfloor \frac{d(t, \alpha)}{\text{quantization step}} \right\rfloor \quad (16)$$

The value D(t, α) represents the quantized version of d(t, α). The quantized values are stored in a table. Note that to reduce the size of the table that must be stored in memory, the differences between each pair of phase results is stored rather than the absolute values. The size of the table that is required can then be expressed as $2^{(N-1)}*NOS*BPS$, where N denotes the number of history bits and BPS represents the number of bits used to represent each sample.

Each phase result is accumulated with the previous phase results and is output to the cosine and sine tables 38, 46 (FIG. 4), respectively, which function to generate the I and Q baseband output signals. The I and Q values are input to mixers 40, 48, respectively. The I mixer 40 multiplies the I signal with the carrier frequency output of oscillator 42. The Q mixer 48 multiplies the Q signal with the carrier frequency shifted 90 degrees by phase shifter 44. The resultant mixer outputs are summed by summer 50 to produce the GFSK output signal to be transmitted onto the channel.

Figure 6:
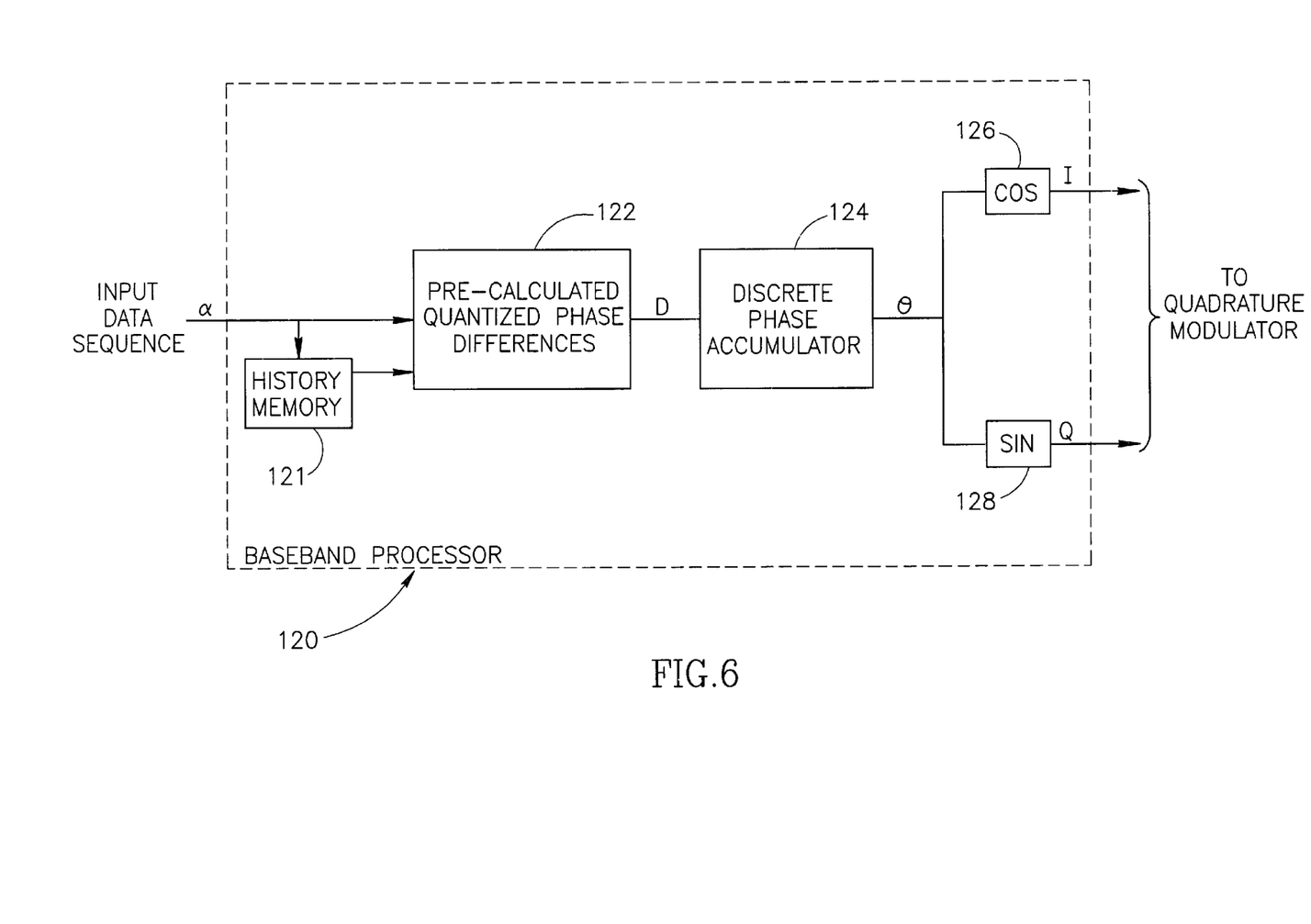
FIG. 6 is a block diagram illustrating the baseband processor of the present invention wherein time is discrete and the phase is quantized.

A block diagram illustrating the baseband processor of the present invention wherein time is discrete and the phase is quantized is shown in FIG. 6. The baseband processor, generally referenced 120, comprises a history memory 121, table of the pre-calculated quantized phase differences 122, a discrete phase accumulator 124 and cosine 126 and sine 128 tables.

The input data sequence a is input to the table of the pre-calculated quantized phase differences 122 and to the history memory 121. The history memory is adapted to store N−1 previous input bits and may comprise a serial in parallel out shift register. Thus, a total of N bits (i.e., the current bit and N−1 history bits) are input to the pre-calculated quantized phase difference table 122 which functions to generate a stream of phase differences D in accordance with the N bit input thereto. The phase differences are accumulated by the discrete phase accumulator 124. The output θ is used to generate the I and Q signal via cosine and sine LUTs.

Note that in some cases, depending on the implementation, the phase accumulator may be implemented using a counter. In this case, each phase difference may be represented by a number P in the group {−M, . . . , 0, . . . ,M} where M is an integer (in the case where the phase differences are pre-calculated rather than the absolute phases themselves). The number P represents an operation using the quantization step. A negative P causes a decrease in the phase accumulator by P quantization steps, a '0' indicates do nothing and a positive P causes an increase in the phase accumulator by P quantization steps.

Note that the table size required for the cosine and sine tables may be reduced by using the symmetry property of cosine and sine. The required size of the cosine and sine tables can be expressed as:

$$\left\lfloor \frac{\frac{1}{\text{quantization step}} + 1}{2} \right\rfloor \times 2 \times \text{width of A/D converter} \quad (17)$$

Figure 7:
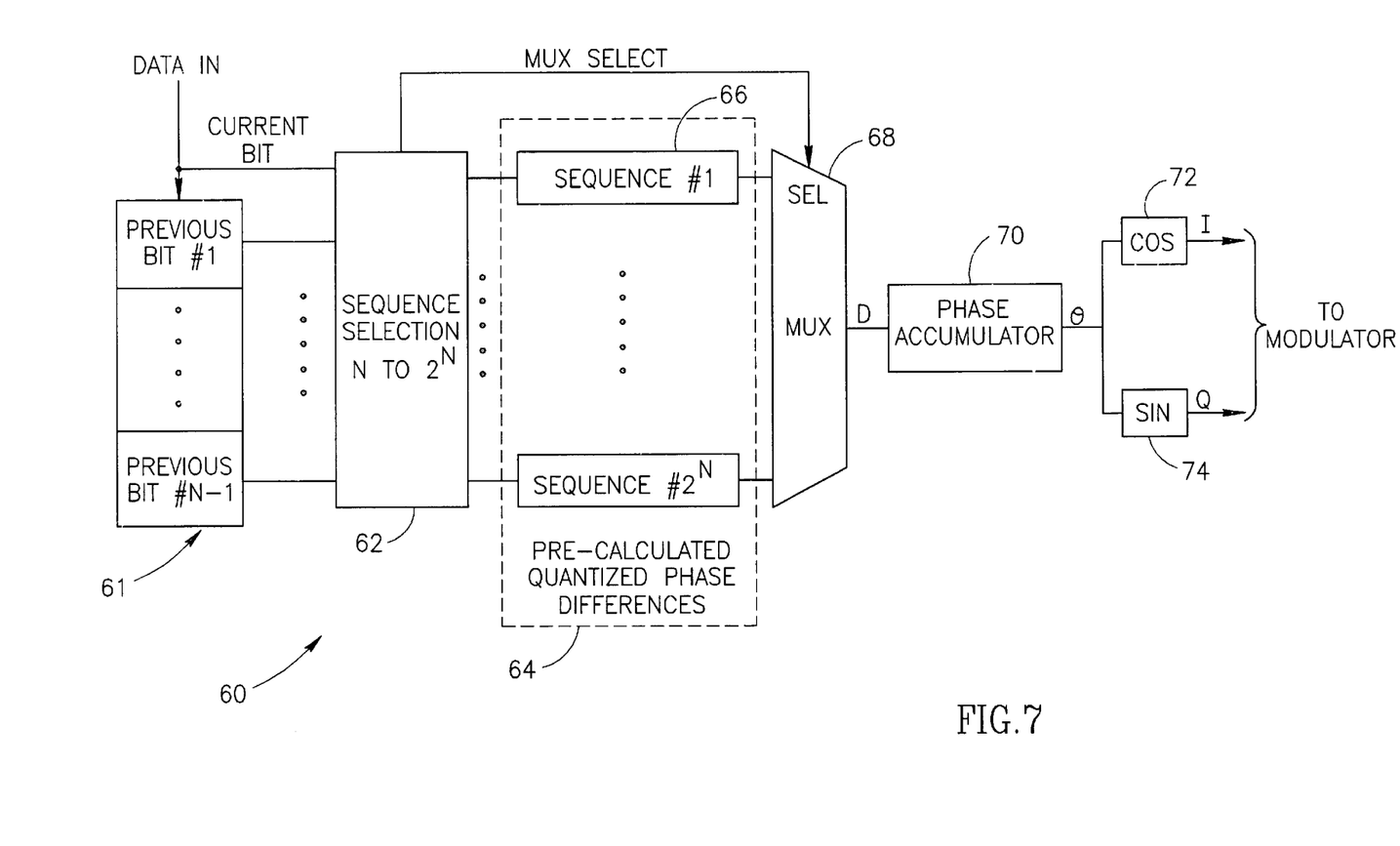
FIG. 7 is a block diagram illustrating the baseband processor and modulator of the present invention in more detail.

A block diagram illustrating the baseband processor and modulator of the present invention in more detail is shown in FIG. 7. The baseband processor, generally referenced 60, comprises a history memory 61, sequence selection circuit 62, pre-calculated quantized phase differences table 64, multiplexer 68, phase accumulator 70 and cosine and sine tables 72, 74.

In this general example, the Gaussian filter is approximated by a function of N bits (i.e., the. convergence time $\Gamma=N$). In operation, the input data sequence is shifted into the history memory 61 that may comprise a shift register or other register file means. The history memory is adapted to be able to store N−1 history bits. The N−1 history bits and the current bit (total of N bits) form the input to the sequence selection circuit 62 which may comprise an N to $2^N$ decoder. The decoder functions to select one of $2^N$ pre-calculated phase difference sequences 66. The length of the sequence is dependent on the number of samples (NOS) used to represent each bit. For example, if NOS=8, each sequence 66 comprises eight phase differences which are output in accordance with the sample clock.

The output of each sequence 66 in the table 64 is input to a $2^N$ to 1 multiplexer 68. The select control of the mux is provided by the sequence selection circuitry 62. The phase differences D output of the mux is accumulated by the phase accumulator 70. The output θ of the phase accumulator is converted to I and Q signals via cosine and sine tables 72, 74, respectively. The I and Q signals are subsequently input to the quadrature modulator 41 (FIG. 4).

Figure 8:
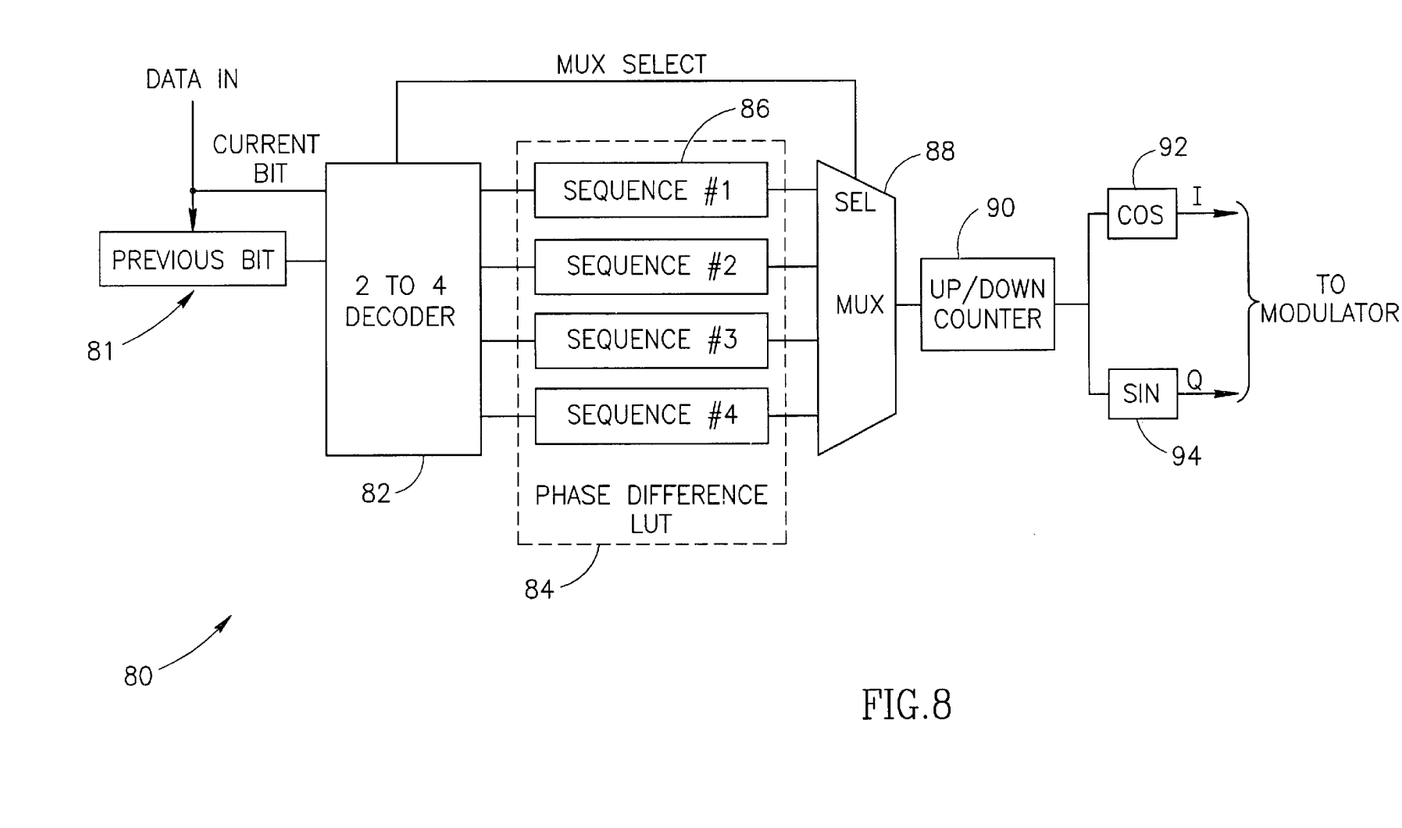
FIG. 8 is a block diagram illustrating an example baseband processor and modulator of the present invention wherein the Gaussian filter is adapted to handle one history bit.

A block diagram illustrating an example baseband processor and modulator of the present invention wherein the Gaussian filter is adapted to handle one history bit is shown in FIG. 8. The baseband processor, generally referenced 80, comprises a history bit register 81, decoder 82, phase difference LUT 84, mux 88, counter 90 and cosine and sine tables 92, 94.

In this example, the convergence time Γ of the Gaussian filter is adapted to be 2 (i.e., the Gaussian filter is approximated by a function of Γ=2 bits). In operation, a one-bit history of the input data sequence is stored in history register 81. The single history bit and the current bit are input to the decoder which functions to select one of four sequences 86, labeled sequence #1 through #4, stored in LUT 84. Each sequence comprises pre-calculated quantized phase differences. When the output of the filter is a function of two bits, there are only four possible combinations of the input data:

1. the previous bit was 0 and the current bit is 0
2. the previous bit was 0 and the current bit is 1
3. the previous bit was 1 and the current bit is 0
4. the previous bit was I and the current bit is 1

Figure 9A:
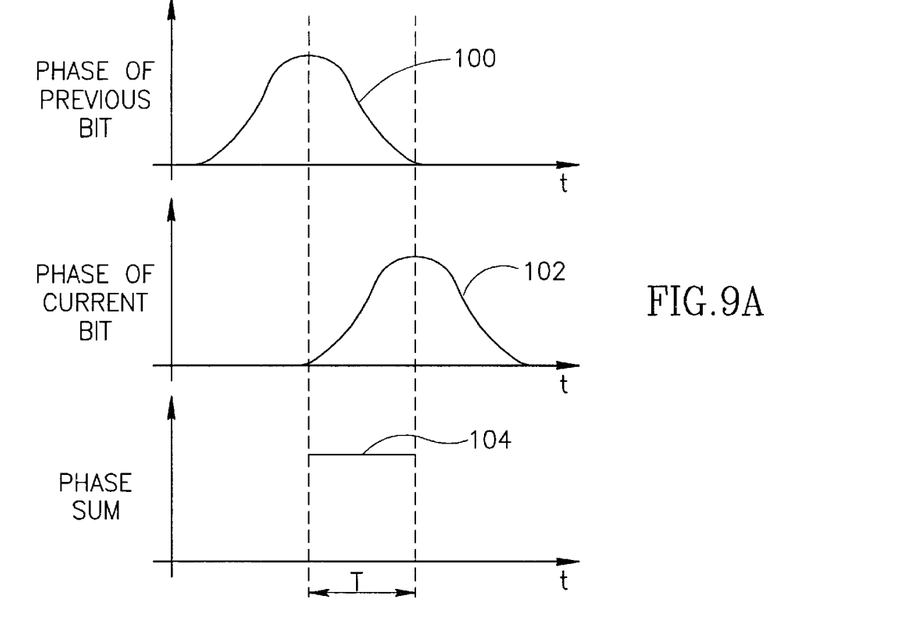
FIG. 9A is a waveform diagram illustrating the phase contribution of the current and previous bits when both are equal.

When the current bit and the previous bit have the same sign then the phase contribution of the current bit is added to the phase contribution of the previous bit (i.e., the response of the filter to each bit is added), as shown in FIG. 9A. The phase of the previous bit (waveform 100) when added to the phase of the current bit (waveform 102) results in a constant sum (waveform 104). The sum represents the amount of phase to be accumulated during this particular bit period. Note that the sum in FIG. 9A is for the case when both previous and current bits are positive (i.e., '1'). When the previous and current bits are negative (−1 or '0') the phase sum is negative.

Figure 10:
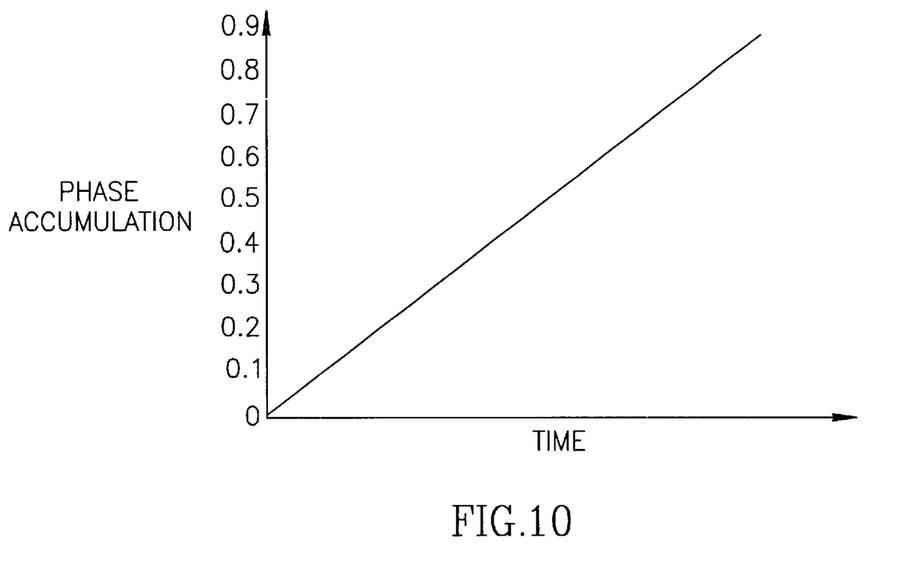
FIG. 10 is a graph illustrating the phase accumulation of the Gaussian filter when the current bit matches the previous bit.

A graph illustrating the phase accumulation of the Gaussian filter when the current bit matches the previous bit is shown in FIG. 10. The straight line has a constant slope and is generated by accumulating (i.e., integrating) the phase sum 104 (FIG. 9A) over a bit period.

Figure 9B:
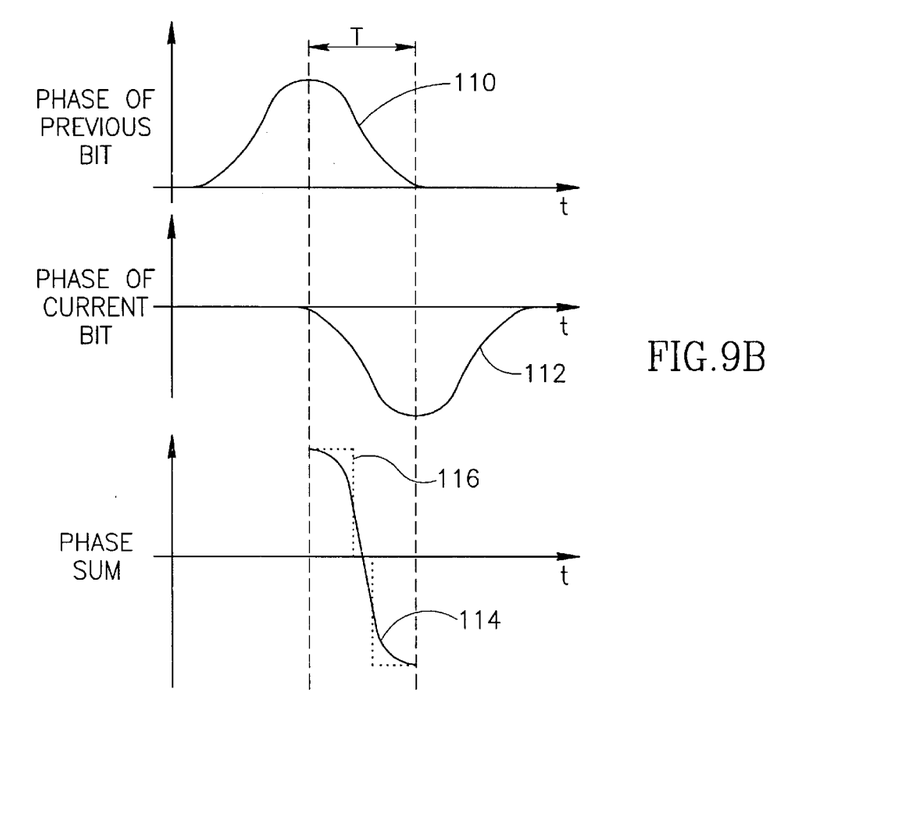
FIG. 9B is a waveform diagram illustrating the phase contribution of the current and previous bits when they are not equal.

Similarly, when the current bit and the previous bits are of opposite signs then the phase contribution of the current bit is subtracted from the phase contribution of the previous bit (i.e., the responses of the filter to each bit are subtracted), as shown in FIG. 9B. The phase of the previous bit (waveform 110) when added to the phase of the current bit (waveform 112) results in a sum which reverses polarity (waveform 116). The sum represents the amount of phase to be accumulated during this particular bit period. Note that the sum in FIG. 9A is for the case when both previous and current bits are positive (i.e., '1'). When the previous and current bits are negative (−1 or '0') the phase sum is negative.

Figure 11:
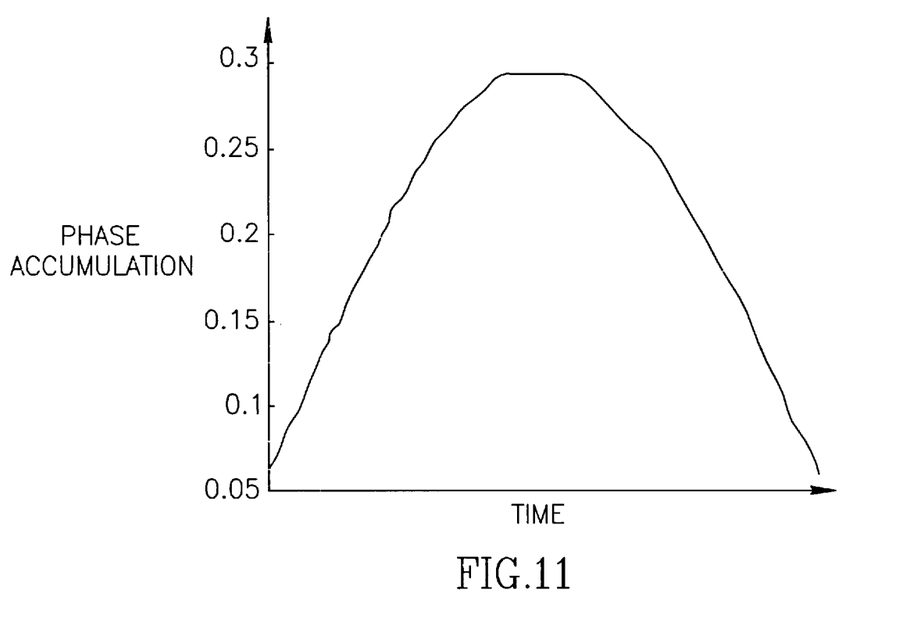
FIG. 11 is a graph illustrating the phase accumulation of the Gaussian filter when the current bit does rot match the previous bit.

A graph illustrating the phase accumulation of the Gaussian filter when the current bit does not match the previous bit is shown in FIG. 11. The straight line has a constant slope and is generated by accumulating (i.e., integrating) the phase sum 114 (FIG. 9B) over a bit period.

In the case when the number of samples NOS=8, the sum 104 may be quantized into −1 and +1 values. The sum is divided into 8 samples of +1 phase steps for the case when both bits are positive (i.e., '1') thus resulting in sequence #1 (FIG. 8) comprising the values {+1, +1, +1, +1, +1, +1, +1, +1}. The sum is divided into 8 samples of −1 phase steps for the case when both bits are negative (i.e., '0') thus resulting in sequence #2 comprising the values {−1, −1, −1, −1, −1, −1, −1, −1}. Note that these two sequences may be combined into one sequence of 8 values by utilizing the sign bit to generate either a sequence of −1's or +1's.

In the case when the number of samples NOS=8, the sum 114 may be quantized into 8 samples of −1, 0, or −1 values. The quantized sum is shown in FIG. 9B as waveform 116. Thus, the contents of sequence #3 comprises {+1, +1, +1, 0, 0, −1, −1, −1} for the case when the current bit is '0' and the previous bit is a '1'. Sequence #4 comprises {−1, −1, −1, 0, 0, +1, +1, +1} for the case when the current bit is a '1' and the previous bit is a '0'. Note that here too, the two sequences may be combined into one sequence of 8 values by utilizing the sign bit to generate the contents of either sequence #3 or #4. This technique may be applied to the circuit of FIG. 7 whereby the number of precalculated quantized phase difference sequences stored is cut in half. In this case, the sequence selection 62 is adapted to select of $2^{N-1}$ sequences rather than $2^N$. Thus, a selection of 0 or 1 select the first sequence, 2 or 3 select the second sequence, and so on. The multiplexer 68 is also modified to select one of $2^{N-1}$ sequences rather than $2^N$.

With reference to FIG. 8, the output of the phase difference LUT 84 is input to a mux 88 which steers the output of one of the sequences to the counter 90. The select control for the mux is derived from the current bit and the previous bit and provided by the decoder 82. In the case when the phase difference LUT comprises four sequences, the mux select control comprises two bits. In the case when it comprises two sequences, as described above, the mux select comprises a single bit. The counter preferably comprises an up/down counter which functions to accumulate the phase differences output from the phase difference LUT via the mux. Note that the counter represents an accumulator that is incremented or decremented by one quantized phase step. An output of '0' from the mux, causes the counter to do nothing and remain at its current count.

Note that the counter may be adapted to increment and decrement phase difference values other than −1, 0 or +1. If higher precision is desired, the phase difference may include more values such as {−3, −2, −1, 0, +1, +2, +3}. In this case, the counter is adapted to increment and decrement its count by 1, 2 or 3.

In addition, the counter is adapted to count modulo a predetermined number. This number determines the resolution and accuracy that is ultimately attainable from the modulator. For example, for a phase quantization step of 0.04 radians, 50 values are needed to complete the unity circle (360 degrees). Thus, the counter is adapted to count modulo 50. The output of the counter is input to the cosine and sine look up tables that should also have a resolution of 50 entries. Note that the symmetry properties of the cosine and sine functions can be utilized to reduce the number of required entries to 13 which cover the values from 0 through $0.48\pi$ (i.e., 0 through 86.4 degrees). A table for the entire unity circle is presented below. The first 13 values for cosine are labeled cos 1 through cos 13. Likewise, the first 13 values for sin e are labeled sin 1 through sin 13.

TABLE 1

Phase and Corresponding Cosine and Sine Values

| Index | Phase | Cos | Sin |
|---|---|---|---|
| 1 | 0 | cos1 | sin1 |
| 2 | 0.04π | cos2 | sin2 |
| 3 | 0.08π | cos3 | sin3 |
| 4 | 0.12π | cos4 | sin4 |
| 5 | 0.16π | cos5 | sin5 |
| 6 | 0.20π | cos6 | sin6 |
| 7 | 0.24π | cos7 | sin7 |
| 8 | 0.28π | cos8 | sin8 |
| 9 | 0.32π | cos9 | sin9 |
| 10 | 0.36π | cos10 | sin10 |
| 11 | 0.40π | cos11 | sin11 |
| 12 | 0.44π | cos12 | sin12 |
| 13 | 0.48π | cos13 | sin13 |
| 14 | 0.52π | −cos13 | sin13 |
| 15 | 0.56π | −cos12 | sin12 |
| 16 | 0.60π | −cos11 | sin11 |
| 17 | 0.64π | −cos10 | sin10 |
| 18 | 0.68π | −cos9 | sin9 |
| 19 | 0.72π | −cos8 | sin8 |
| 20 | 0.76π | −cos7 | sin7 |
| 21 | 0.80π | −cos6 | sin6 |
| 22 | 0.84π | −cos5 | sin5 |
| 23 | 0.88π | −cos4 | sin4 |
| 24 | 0.92π | −cos3 | sin3 |
| 25 | 0.96π | −cos2 | sin2 |
| 26 | 1.00π | −cos1 | −sin1 |
| 27 | 1.04π | −cos2 | −sin2 |
| 28 | 1.08π | −cos3 | −sin3 |
| 29 | 1.12π | −cos4 | −sin4 |
| 30 | 1.16π | −cos5 | −sin5 |
| 31 | 1.20π | −cos6 | −sin6 |
| 32 | 1.24π | −cos7 | −sin7 |
| 33 | 1.28π | −cos8 | −sin8 |
| 34 | 1.32π | −cos9 | −sin9 |
| 35 | 1.36π | −cos10 | −sin10 |
| 36 | 1.40π | −cos11 | −sin11 |
| 37 | 1.44π | −cos12 | −sin12 |
| 38 | 1.48π | −cos13 | −sin13 |
| 39 | 1.52π | cos13 | −sin13 |
| 40 | 1.56π | cos12 | −sin12 |
| 41 | 1.60π | cos11 | −sin11 |
| 42 | 1.64π | cos10 | −sin10 |

TABLE 1-continued

Phase and Corresponding Cosine and Sine Values

| Index | Phase | Cos | Sin |
|---|---|---|---|
| 43 | 1.68π | cos9 | −sin9 |
| 44 | 1.72π | cos8 | −sin8 |
| 45 | 1.76π | cos7 | −sin7 |
| 46 | 1.80π | cos6 | −sin6 |
| 47 | 1.84π | cos5 | −sin5 |
| 48 | 1.88π | cos4 | −sin4 |
| 49 | 1.92π | cos3 | −sin3 |
| 50 | 1.96π | Cos2 | −sin2 |

If the 13 cosine and sin e values are quantized to 6 bits, the following table may be used. Note that the 6 bits comprise a sign bit and 5 magnitude bits. In this case, the total bit count to generate the I and Q values is 13*6*2=156 bits.

TABLE 2

Quantized Cosine and Sine Values

| Index | Cosine | Sine |
|---|---|---|
| 1 | 31 | 0 |
| 2 | 31 | 4 |
| 3 | 30 | 8 |
| 4 | 29 | 11 |
| 5 | 27 | 15 |
| 6 | 25 | 18 |
| 7 | 23 | 21 |
| 8 | 20 | 24 |
| 9 | 17 | 26 |
| 10 | 13 | 28 |
| 11 | 10 | 29 |
| 12 | 6 | 30 |
| 13 | 2 | 31 |

It is intended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A digital baseband processor for generating baseband I and Q values in a Gaussian Frequency Shift Keying (GFSK) transmitter, comprising:

a sequence look up table (LUT) adapted to generate $2^N$ sequences of differences of quantized phase results wherein N represents a current bit and N−1 history bits, said sequences of phase differences produced by calculating a response to a Gaussian filter for all possible combinations of said N bits and computing the difference between each pair of phase results in a sequence;

a register adapted to store said current bit and said N−1 history bits;

selection means for selecting one of said $2^N$ sequences of phase differences and for outputting the contents thereof in accordance with the contents of said register;

a phase accumulator adapted to accumulate the phase differences output of said sequence LUT;

a cosine LUT comprising quantized cosine values and adapted to generate an I baseband signal in accordance with the output of said phase accumulator; and a sine LUT comprising quantized sine values and adapted to generate a Q baseband signal in accordance with the output of said phase accumulator.

2. The baseband processor according to claim 1, wherein said sequence LUT is adapted to store (½)($2^N$) sequences by utilizing symmetry properties of said sequences.

3. The baseband processor according to claim 1, wherein said sequence LUT is adapted to store P phase differences per sequence, wherein P represents the number of samples per bit.

4. The baseband processor according to claim 3, wherein the number of samples per bit P is equal to 8.

5. The baseband processor according to claim 1, wherein said sequence LUT is adapted to represent the value of each phase difference as a value in the group {−1, 0 or 1} wherein −1 indicates decrease said phase accumulator by one phase step, 0 indicates do not decrease or increase said phase accumulator and 1 indicates increase said phase accumulator by one phase step.

6. The baseband processor according to claim 1, wherein said sequence LUT is adapted to represent the value of each phase difference as a value R in the group {−M, . . . , −1, 0, 1, . . . , M} wherein R<0 indicates decrease said phase accumulator by R phase steps, 0 indicates do not decrease or increase said phase accumulator and R>0 indicates increase said phase accumulator by R phase steps.

7. The baseband processor according to claim 1, wherein N equals 2.

8. The baseband processor according to claim 1, wherein N equals 3.

9. The baseband processor according to claim 1, wherein said Gaussian filter response is given by $$g(t) = \frac{BT}{T\sqrt{2\pi}} e^{-\left(\frac{t}{T}\right)^2 \left(\frac{BT}{T}\right)^2}$$

where BT is the Gaussian roll off factor and T is the bit period.

10. The baseband processor according to claim 1, wherein said selection means comprises a $2^N$ decoder.

11. A digital modulator for generating a Gaussian Frequency Shift Keying (GFSK) signal, comprising:

a sequence look up table (LUT) for generating $2^N$ sequences of precalculated differences of quantized phase results wherein N represents a current bit and N−1 history bits, said sequences of phase differences produced by calculating a Gaussian filter response to all possible combinations of said N bits and computing the difference between each pair of phase results in a sequence;

a register adapted to store said current bit and said N−1 history bits;

selection means for selecting one of said $2^N$ sequences of phase differences and for outputting the contents thereof in accordance with the contents of said register;

a phase accumulator adapted to accumulate the phase differences output of said sequence LUT;

a cosine LUT comprising quantized cosine values and adapted to generate an I baseband signal in accordance with the output of said phase accumulator;

a sine LUT comprising quantized sine values and adapted to generate a Q baseband signal in accordance with the output of said phase accumulator; and a quadrature modulator adapted to modulate said I baseband signal and said Q baseband signal with a carrier signal so as to generate said GFSK signal.

12. The modulator according to claim 11, wherein said quadrature modulator comprises:

a frequency source adapted to output said carrier signal at a frequency $f_c$;

a phase shifter adapted to output said carrier frequency phase shifted 90 degrees;

a first mixer adapted to output a first mixer signal generated by mixing said I baseband signal with said carrier signal;

a second mixer adapted to output a second mixer signal generated by mixing said Q baseband signal with said phase shifted carrier signal; and a summer adapted to sum said first mixer signal and said second mixer signal so as to yield said GFSK signal.

13. A method of generating baseband I and Q values in a Gaussian Frequency Shift Keying (GFSK) transmitter, said method comprising the steps of:

generating $2^N$ sequences of differences of quantized phase results wherein N represents a current bit and N−1 history bits, said sequences of phase differences produced by calculating a response to a Gaussian filter for all possible combinations of said N bits and computing the difference between each pair of phase results in a sequence;

storing said current bit and said N−1 history bits in a memory;

selecting one of $2^N$ sequences of phase differences and outputting the contents thereof in accordance with the contents of said memory;

accumulating the phase differences output of a sequence LUT;

generating an I baseband signal in accordance with said phase differences output; and generating a Q baseband signal in accordance with said phase differences output.

14. The method according to claim 13, wherein said step of generating said $2^N$ sequences comprises storing (½)($2^N$) sequences and utilizing symmetry properties of said sequences to generate the remaining (½)($2^N$) sequences.

15. The method according to claim 13, wherein said step of generating said $2^N$ sequences comprises storing P phase differences per sequence, wherein P represents the number of samples per bit.

16. The method according to claim 15, wherein a number of samples per bit P is equal to 8.

17. The method according to claim 13, wherein the value of each phase difference is represented as a value in the group {−1, 0 or 1} wherein −1 causes the phase accumulation to decrease by one phase step, 0 does nothing and +1 causes the phase accumulation to increase by one phase step.

18. The method according to claim 13, wherein the value of each phase difference is represented as a value R in the group {−M, . . . , −1, 0, 1, . . . , M} wherein R<0 causes the phase accumulation to decrease by R phase steps, 0 does nothing and R>0 causes the phase accumulation to increase by R phase steps.

19. The method according to claim 13, wherein N equals 2.

20. The method according to claim 13, wherein N equals 3.

21. The method according to claim 13, wherein said Gaussian filter response is given by $$g(t) = \frac{BT}{T\sqrt{2\pi}} e^{-\left(\frac{t}{T}\right)^2 \left(\frac{BT}{T}\right)^2}$$

where BT is the Gaussian roll off factor and T is the bit period.

* * * * *